March 14, 1967 R. Y. SIMS ETAL 3,309,576

TELEPHONE EQUIPMENT HOUSING

Filed March 23, 1965

INVENTORS
R. Y. SIMS
A. I. BOTTNER

BY [signature] ATTY.

3,309,576
Patented Mar. 14, 1967

3,309,576
TELEPHONE EQUIPMENT HOUSING

Robert Y. Sims, Hato Rey, and Alfred I. Bottner, Miramar, Santurce, Puerto Rico, assignors to International Telephone and Telegraph Corporation, a corporation of Maryland Filed Mar. 23, 1965, Ser. No. 442,134
4 Claims. (Cl. 317—99)

This invention relates to telephone systems, and more particularly to means for housing such systems.

Many telephone systems utilize electromechanical and related devices to complete certain desired functions. Broadly speaking, these devices may be divided into working and non-working parts. The working parts include such things as relays, stepping switches, crossbar switches, and the like. These parts must be kept free of dust and other contaminents. They must also be protected against an intrusion of foreign objects. The non-working parts include terminal strips, fuses and the like, which must be easily available at all times for maintenance.

Cabinets are commonly provided to enclose these parts. These cabinets both protect the working parts and give ready access to the non-working parts. Heretofore, this dual function has been accomplished by providing hinged access doors or separate covers for the working and non-working parts. Although these doors and covers are relatively inexpensive items in a telephone exchange, they do represent an item of cost and convenience. Moreover, they are used widely throughout the system and, therefore, any savings on these items are multiplied many times.

Accordingly, an object of the invention is to provide new and improved telephone equipment housings. In this connection, an object is to provide extremely low cost housings. Here an object is to normally give ready access to some components while making other components relatively inaccessible. A further object is to provide a cover which may be removed quickly and easily to give complete access to all components.

Another object is to provide a housing having a pleasing appearance. Yet another object is to provide a housing having the above characteristics which can be manufactured at low cost on general purpose machine tools without requiring many manufacturing steps.

In keeping with one aspect of the invention, these and other objects are accomplished by providing a conventional relay rack having equipment horizontally disposed thereon. The working equipment is on one end and the non-working equipment on the other end of the horizontal disposition. Spaced parallel rails positioned above and below the equipment provide a pair of tracks for slidably supporting the housing cover. The housing cover is a simple piece of folded sheet metal adapted to run on the tracks. The proportions and dimensions are such that the panel may be slid sideways far enough to expose the non-working elements but not far enough to expose the working elements. Catches are provided for allowing the panel to be removed from the rails to expose all equipment.

The above mentioned and other features of this invention and the manner of obtaining them will become more apparent, and the invention itself will be best understood by reference to the following description of an embodiment of the invention taken in conjunction with the accompanying drawings, in which.

Figure 1:
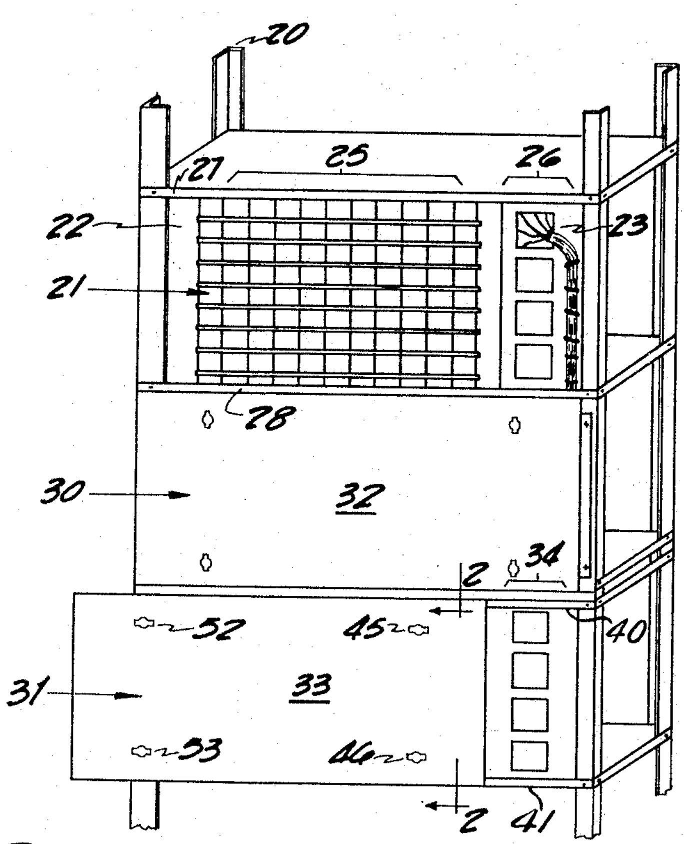
FIG. 1 is a perspective view which shows a rack of telephone equipment and illustrates the three possible cover panel conditions.

FIG. 1 shows a conventional rack 20 for supporting telephone equipment. The equipment is horizontally disposed in a plurality of shelf-like positions on this rack. For example, the equipment 21 is shown as horizontally disposed between the brackets 22, 23. Working equipments 25 are at one end, and non-working equipments 26 are at the other end of the horizontal disposition.

A pair of spaced, parallel rails 27, 28 are positioned above and below the equipment 21. These rails provide a pair of tracks for slidably supporting a panel which forms the housing cover. No panel is shown in front of equipment 21 because this equipment illustrates the complete access that is given when the cover is removed.

Other similar equipment is positioned on two lower shelves at 30, 31. This equipment is protected by the cover panels 32, 33. Each of these panels is a simple piece of folded sheet metal, shaped and proportioned to slide on the tracks formed by the upper and lower rails.

When a panel is in the normal position shown at 32, both the working and non-working equipment are covered. However, the proportions and dimensions are such that the panel may be slid sideways to an off-normal position which is far enough to expose the non-working elements. Panel 33 is shown in this off-normal position where the non-working element 34 (here a terminal strip) is exposed.

The panel 33 does not normally slide far enough to expose the working elements. It should be recognized, of course, that this is primarily a matter of definition. The cabinet may be designed to expose as much or as little equipment as may be required.

Figure 2:
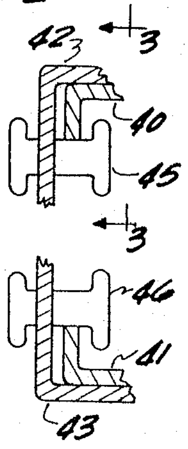
FIG. 2 is a cross-sectional view which shows a cover panel, two catches, and rails taken along line 2—2 of FIG. 1.
Figure 3:
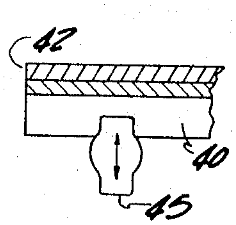
FIGS. 3 and 4 are plan views which are taken along line 3—3 of FIG. 2 and show the two positions of the catch or turn button used for a cover latch.
Figure 4:
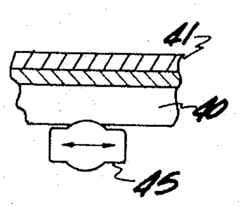

FIGS. 2–4 illustrate how turn button catches may be provided for allowing the panels to be removed from the rails. In greater detail, the panel is just wide enough to cover the rails 40, 41. The edges of the panel are folded at 42, 43 to fit loosely over the rails 40, 41.

Upper and lower catches 45, 46 capture the rails 40, 41 when the panels are in place. More particularly, each of these catches is an elongated or butterfly shaped, turn button device which may be rotated to a vertical position to capture the rail 40 (as shown in FIG. 3) or to a horizontal position to allow escape of the rail 40 catches as shown in FIG. 4. Ideally, these catches may be made from a wear resistant material which does not require lubrication, such as nylon, for example.

Four of the turn button catches hold the panel on the rails as shown at 52, 53, 45, 46 in FIG. 1.

It should now be clear that there are three principal conditions or positions for the panel. First, the catches may be rotated to allow escape of the rails, and the panel may be completely removed from the rack, as shown at 21. Second, the panel may be put in a normal or closed position covering all equipment. Here the turn button is rotated to capture the rail, as shown in FIG. 3. Third, the panel may be slid to an off-normal or open position to expose certain equipment.

The advantages derived from the invention include a pleasing and uncluttered external appearance. The panels can be made on general purpose machine tools commonly used for cutting and folding sheet metal (such as a punch press) with an extremely simple fabrication process. The panels may be removed quickly and easily to give ready access to all equipment. However, until the panels are so removed, some of the elements are accessible and the other elements are not accessible.

While the principles of the invention have been described above in connection with specific apparatus and applications, it is to be understood that this description is made only by way of example and not as a limitation on the scope of the invention.

We claim:

1. A relay rack having a plurality of vertically stacked shelf sections with telephone equipment horizontally disposed thereon, certain equipment being positioned at one end of said horizontal disposition and other equipment being positioned at the other end of said horizontal disposition, spaced parallel rails positioned above and below said horizontal disposition on each shelf to provide a pair of tracks, and a cover panel slidably supported on said rails for enclosing all of said equipment when said panel is in a normal position, the proportions and dimensions of said equipment and panels providing access to said certain equipment while denying access to said other equipment when said panel is horizontally slid to an off normal position.

2. The rack of claim 1 and rotatable turn button catches mounted on said cover panel for capturing or releasing said rails to hold said panels in place on said tracks or allow said panels to be removed from said tracks.

3. The rack of claim 2 wherein said certain equipment comprises a plurality of terminals for interconnecting said other equipment with external equipment.

4. The rack of claim 3 wherein said other equipment comprises telephone crossbar switches.

References Cited by the Examiner

FOREIGN PATENTS 1,261,999 4/1961 France.

ROBERT K. SCHAEFER, *Primary Examiner.*

M. GINSBURG, *Assistant Examiner.*